United States Patent
Harrington

(10) Patent No.: US 11,212,117 B2
(45) Date of Patent: Dec. 28, 2021

(54) TAMPER-RESISTANT SOFTWARE DEVELOPMENT LIFECYCLE PROVENANCE

(71) Applicant: T-Mobile USA, Inc., Bellevue, WA (US)

(72) Inventor: Richard Harrington, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 580 days.

(21) Appl. No.: 16/208,407

(22) Filed: Dec. 3, 2018

(65) Prior Publication Data

US 2020/0177397 A1 Jun. 4, 2020

(51) Int. Cl.
*H04L 9/32* (2006.01)
*G06F 8/70* (2018.01)
*G06F 21/64* (2013.01)

(52) U.S. Cl.
CPC .............. *H04L 9/3268* (2013.01); *G06F 8/70* (2013.01); *G06F 21/64* (2013.01); *H04L 9/321* (2013.01); *H04L 9/3236* (2013.01); *H04L 9/3247* (2013.01); *H04L 9/3297* (2013.01)

(58) Field of Classification Search
CPC .............................. H04L 9/321; H04L 9/3268
See application file for complete search history.

(56) References Cited

U.S. PATENT DOCUMENTS

| 7,330,978 | B1 | 2/2008 | Harrington et al. |
| 10,579,974 | B1* | 3/2020 | Reed .................... G06Q 20/105 |
| 2018/0183606 | A1* | 6/2018 | High .................... H04L 9/3239 |
| 2019/0384587 | A1* | 12/2019 | Rao ........................ H04L 9/3239 |
| 2020/0073651 | A1* | 3/2020 | Rodriguez Bravo ....................... H04L 63/123 |

* cited by examiner

*Primary Examiner* — William S Powers
(74) *Attorney, Agent, or Firm* — Han Santos, PLLC

(57) ABSTRACT

A validation record chain that is generated for a particular version of a software package may be used to verify the legitimacy of the particular version. A hash that is generated by a software building platform for a particular version of a software package is received. A validation record chain for the particular version is then generated that includes a plurality of certificates such that a first certificate in the validation record chain contains the hash, and each of one or more subsequent certificates is signed with a corresponding hash signature of a corresponding certifier application and contains a prior hash signature of a previous certificate in the validation record chain. The validation record chain is stored for validation of the particular version of the software package via the plurality of certificates.

20 Claims, 7 Drawing Sheets ated digitally signed validation status certificate. The hash signature of a digitally signed validation status certificate in the time certificate may be a hash of the corresponding validation status certificate that is encrypted using a cryptographic key of the trusted time stamper platform.

TAMPER-RESISTANT SOFTWARE DEVELOPMENT LIFECYCLE PROVENANCE

BACKGROUND

Software goes through many steps before being released into production or sold commercially. The development of a software package is tracked through multiple control points to satisfy both internal and external requirements. These control points may include automated tests, manual tests, and assertions by various groups or individuals that specified criteria have been met. In some instances, a software developer may be required to document the various tests performed and assertions that are made during the development of the software in order to meet corporate compliance regulations, such as Sarbanes-Oxley regulations with respect to data retention and data security.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
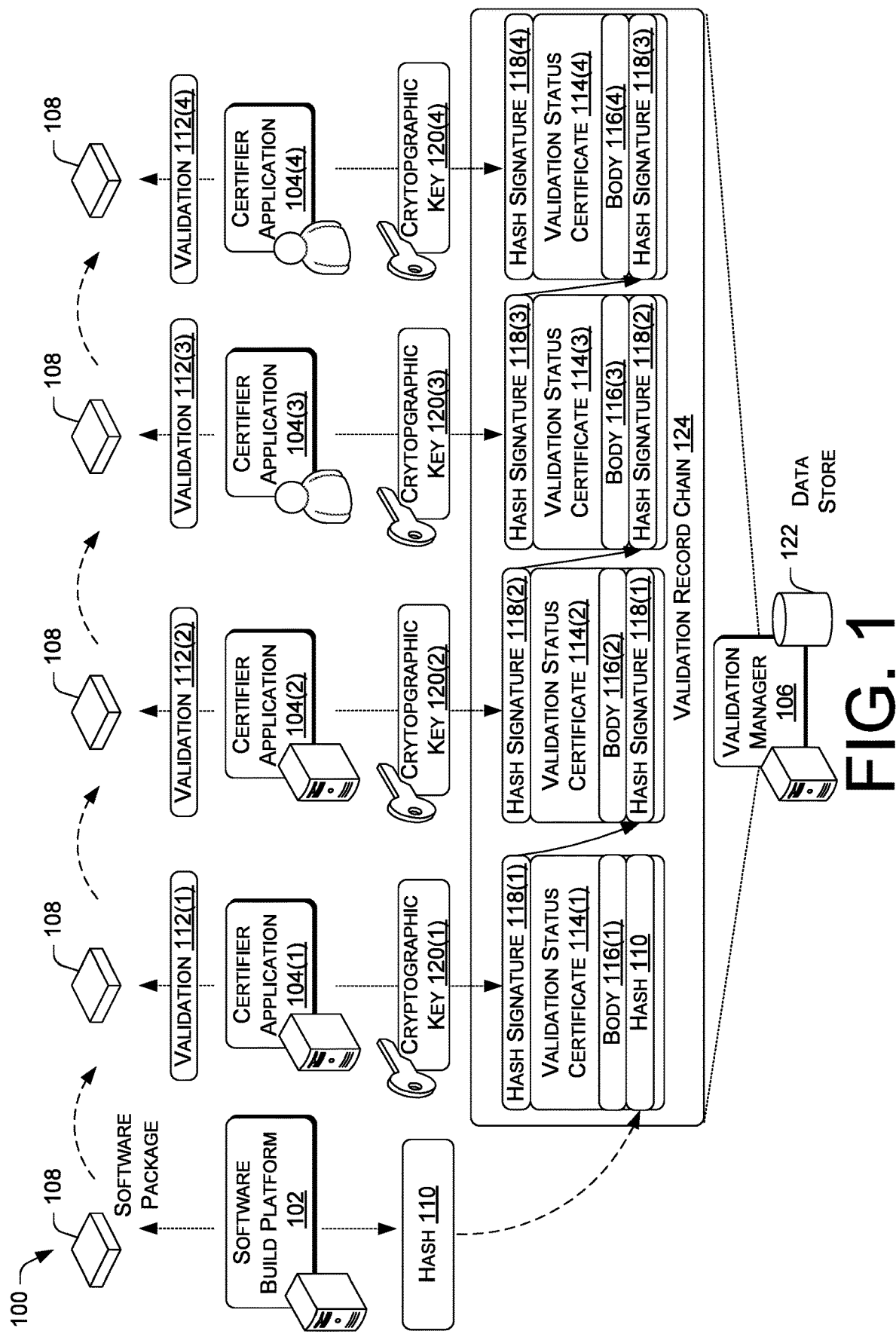
FIG. 1 illustrates an example architecture for using a validation record chain to store the development provenance of a software package in a tamper-resistant manner.

This disclosure is directed to techniques that enable a software developer to generate a validation record chain that stores the software development provenance of a software package. The development of a version of a software package is tracked through multiple control points to satisfy both internal and external requirements. These control points may include automated tests, manual tests, and assertions by various groups or individuals that specified criteria have been met. As the software package moves through each of the control points, a certifier application under the control of an automated test process (e.g., a test unit or business process) or a human certifier may generate a digitally signed validation status certificate to assert that one or more corresponding criteria were met. The criteria may include that the software package successfully passed a test, meets one or more regulations, contains or excludes certain third-party software codes, and/or so forth. The digitally signed validation status certificates from the multiple control points are stored as linked records in a validation record chain. For example, a software build platform that generated a version of the software package may also generate a hash signature. The hash signature is incorporated by a first certifier application at a first control point into a first validation status certificate that is generated by the first certifier application. The first validation status certificate may include metadata about the build of the software package, such as information about the software build platform used to generate the build, events that triggered the build, the location and version information for the source, etc. The first certifier application may generate the first validation status certificate after determining that the software package meets one or more criteria of the first control. The first validation status certificate is then digitally signed by the first certifier application with a first hash signature. The first hash signature is generated by calculating a hash of the first validation status certificate via a hash algorithm, and then encrypting the hash with a unique cryptographic key of the first certifier application to generate the first hash signature. The software package is then passed on to a second control point.

In turn, a second certifier application at the second control point may generate a second validation status certificate when the software package is determined to meet one or more criteria of the second control point, in which the first hash signature is incorporated into the second validation status certificate. The second validation status certificate is then digitally signed by the second certifier application with a second hash signature. The second hash signature is generated by calculating a hash of the second validation status certificate via a hash algorithm, and then encrypting the hash with a unique cryptographic key of the second certifier application. The software package is then passed on to a third control point for certification by a third certifier application, and so on and so forth.

In this way, as the software package is determined to meet the one or more criteria at each subsequent control point, an additional digitally signed validation status certificate may be appended to the end of the growing validation record chain. Accordingly, the validation record chain may grow until the software package passes all the control points. Further, each subsequent record, i.e., each digitally signed certificate in the validation record chain, is chain-linked to a previous record by a hash signature of the previous record. In this way, as the validation record chain grows, the subsequent records in the record chain are linked to one or more previous records and their hash signatures. Alternatively, the validation record chain may stop growing when the software package fails one or more criteria at a control point, and the failure is recorded in a validation status certificate. The failure of the software package to pass one or more criteria at a control point may result in the software build platform generating a new version of the software package. In turn, a new validation record chain is then generated in the same manner and retained by the validation manager. In some instances, each of the validation status certificates generated by the certifier applications may be further certified by a trusted time stamper platform with a time certificate that indicates the corresponding validation status certificate is issued at a specific time and date. The time certificate contains a hash signature of the corresponding validation status certificate, and the time certificate is signed with a hash signature of the trusted time stamper platform in a similar manner as a validation status certificate. Accordingly, the time certificate may be appended to the corresponding validation status certificate in a validation record chain.

A validation record chain that is generated for a specific version of a software package may be used to verify the legitimacy of the specific version. Since each certificate in the validation record chain is protected by a hash signature that is embedded in a subsequent certificate, it is not possible to alter the content of any certificate without altering the hash signatures of the validation record chain. Accordingly, any tampering of the certificates in the validation record chain of a software package, or a misuse of a different validation record chain belonging to another software package as the validation record chain for the software package, is readily detectable by altered hash signatures. In this way, the validation and verification that a specific version of a software package is a legitimate version may be automated in a reliable and efficient manner. Further, the use of validation record chains may improve the productivity of software development by recording and ensuring that all criteria at control points are met. The techniques described herein may be implemented in a number of ways. Example implementations are provided below with reference to the following figures.

Example Architecture

FIG. 1 illustrates an example architecture 100 for using a validation record chain to store the development provenance of a software package in a tamper-resistant manner. The example architecture 100 may include a software build platform 102, certifier applications 104(1)-104(4), and a validation manager 106 that are executing on computing devices. The software build platform 102 may provide a software development environment (SDE) that enables multiple users to collaboratively develop a version of a software package. The software build platform 102 may be implemented on one or more computing nodes. The computing devices and the computing nodes may be communicatively coupled to each other via a network. In various embodiments, the network may be a wireless carrier network, a local area network (LAN), a larger network such as a wide area network (WAN), and/or a collection of networks, such as the Internet.

Each of the certifier application 104(1)-104(4) may be an application that generates a digital validation status certificate at a corresponding control point to certify that the version of the software package has met one or more criteria. In some instances, a certifier application may be an automated unit that performs an automated test of the software package. For example, the test may be a unit test, code quality test, a security test, or another software test. Once an automated test process completes a test, the automated test process may generate a validation status certificate. The validation status certificate may indicate whether the software package passed or failed the test. In another example, the automated test process may be configured to check the software package for the presence or absence of certain third-party add-on code, such as software tools, software libraries, software development kits (SDKs), etc. The code may be third-party code that belongs to another software vendor or is open source software. Accordingly, the automated test process may, depending on the context, issue a validation status certificate that indicates whether the software package failed or passed a requirement. For example, a validation may be encoded in a validation status certificate as a set of business rules with testable assertions using a domain-specific language.

In other instances, a certifier application may be a certificate generation application that is used by a human tester to generate a validation status certificate. For example, the human tester may perform a user acceptance test, a performance test, a business acceptance test, or another manual test. Alternatively, the human tester may be tasked with the duty of manually reviewing the software package for compliance with government regulations, manually determining whether the software package meets legal standards, or manually ascertaining whether the software meets one or more other requirements. Accordingly, if the human tester determines that the software package meets a requirement, the human tester may indicate to the certifier application that the requirement is met. In turn, the certifier application may generate a validation status certificate stating that the software package meets the requirement. Conversely, if the human tester determines that the software package does not meet the requirement, the human tester may indicate to the certifier application that requirement is not met. In turn, the certifier application may generate a validation status certificate stating that the software package does not meet the requirement.

The validation manager 106 may be responsible for guiding a version of a software package through a series of validation tests that verifies that the version meets all mandated requirements. The validation manager may generate a validation record chain that documents the validation tests conducted and the requirements that are met. In various embodiments, the validation manager 106 may be loaded with a configuration file that controls the validation of the software package. The configuration file may list a set of control points and the certifier applications that are responsible for providing the validation status certificates at the control points. Accordingly, the validation manager 106 may sequentially send the software package down the list of certifier applications until either the version of the software package has passed all the requirements, or a certifier application indicates that the version has failed a requirement.

In an example operation sequence, the software build platform 102 may build a particular version of a software package 108 based on a set of source code. The particular version of the software package 108 may be identified by a build identifier. For example, the build identifier may include a major release number, a minor release number, a revision number, a patch number, and/or so forth. The software build platform 102 may be further configured to generate a hash 110 for the particular version of the software package 108. The hash 110 may be generated based on the source code of the software package 108 or on the binary code of the software package 108. In some instances, the source code or the binary code used to generate the hash 110 may include third-party software code that is included in the software package 108, such as software tools, software libraries, software development kits (SDKs), etc. The software building platform 102 may store the software package 108 and the hash 110 at a network storage location that is known to the validation manager 106. Subsequently, the software building platform 102 may notify the validation manager 106 that the particular version of the software package 108 is ready for validation. Accordingly, the validation manager 106 may direct the certifier application 104(1) to perform a validation 112(1) of the particular version.

In some embodiments, the validation manager 106 may provide the certifier application 104(1) with a network address of the network storage location where the particular version of the software package 108 and the hash 110 are stored. The network address may be a Uniform Resource Locator (URL), an Internet Protocol (IP) address, a file directory location, or some other network location identifier. Accordingly, the certifier application 104(1) may access the software package 108 via the network address. The network location may be protected by an authentication mechanism that grants the certifier application 104(1) access following the submission of a proper authentication credential of the certifier application 104. The validation manager 106 may send the network address to the certifier application 104(1) via a secure communication session, such as an HTTP Secure (HTTPS) communication session, an OAuth2 session, and/or so forth. In other embodiments, the validation manager 106 may send the hash 110 to the certifier application 104 via a secure file transfer mechanism, while providing the certifier application 104(1) with the network address of the network storage location via the secure communication session. For example, the secure file transfer mechanism may be a Secure Copy Protocol (SCP) application, a Secure File Transfer Protocol (SFTP) application, an HTTP Secure (HTTPS) file transfer application, and/or so forth.

The certifier application 104(1) may access and validate the particular version of the software package 108 that is stored at the network storage location. For example, the certifier application 104(1) may perform one or more software unit tests on the particular version. Thus, the particular version of the software package 108 is deemed to have met a validation requirement when the particular version passes the one or more software unit test. Accordingly, the certifier application 104(1) may generate a validation status certificate 114(1) that indicates that the particular version has met the validation requirement. The body 116(1) of the validation status certificate 114(1) may include data regarding the executed validation, such as the identifier of the certifier application 104(1), identification information of the one or more tests performed, the results of such tests, and/or an indication of whether the particular version meets a requirement. Further, the certifier application 104(1) may embed the hash 110 of the software package 108 in the validation status certificate 114(1). Subsequently, the certifier application 104(1) may sign the validation status certificate 114(1) with a unique hash signature 118(1) using a cryptographic key 120(1). The cryptographic key 120(1) may be a private key that is unique to the certifier application 104(1). In various embodiments, the hash signature 118(1) is created by calculating a hash of the validation status certificate 114(1) via a hashing algorithm (e.g., HMAC, SHA256, RSASSA-PSS, etc.), and then encrypting the hash with the cryptographic key 120(1) to generate the hash signature 118(1). The unique hash signature 118(1) is then stored in the network storage location in place of the hash 110. In some embodiments, the certifier application 104(1) may be configured to automatically replace the hash 110 with the hash signature 118(1). In other embodiments, the replacement of the hash 110 by the hash signature 118(1) at the network storage location may be performed by the validation manager 106. Further, the validation manager 106 may store the validation status certificate 114(1) as signed with the hash signature 118(1) in a data store 122 of the validation manager 106 as a first validation record in a validation record chain 124 for the particular version of the software package 108. In some embodiments, the certifier application 104(1) may be directed by the validation manager 106 to save the signed validation status certificate 114(1) in the data store 122. In other embodiments, the certifier application 104(1) may send the signed validation status certificate 114(1) to the validation manager 106 via a secure communication session. In turn, the validation manager 106 may store the signed validation status certificate 114(1) in the data store 122.

Subsequently, at the next control point, the validation manager 106 may direct the certifier application 104(2) to perform a validation 112(2) of the particular version of the software package 108. In order to do so, the validation manager 106 may provide the certifier application 104(2) with a network address of the network storage location where the particular version of the software package 108 and the hash signature 118(1) are stored. Alternatively, the validation manager 106 may send the hash signature 118(1) to the certifier application 104(1) via a secure file transfer mechanism, while providing the certifier application 104(1) with a network address of the network storage location via the secure communication session.

Accordingly, the certifier application 104(2) may access and validate the particular version of the software package 108 that is stored at the network storage location in a similar manner as the certifier application 104(1). For example, the certifier application 104(2) may perform one or more code quality tests on the particular version. Thus, the particular version of the software package 108 is deemed to have met a validation requirement when the software package 108 passes the one or more code quality tests. As a result, the certifier application 104(2) may generate a validation status certificate 114(2) that indicates that the particular version of the software package 108 has met the validation requirement. The body 116(2) of the validation status certificate 114(2) may include data regarding the executed validation, such as the identifier of the certifier application 104(2), identification information of the one or more tests performed, the results of such tests, and/or an indication of whether the particular version meets a requirement. Further, the certifier application 104(2) may embed the hash signature 118(1) in the validation status certificate 114(2). Subsequently, the certifier application 104(2) may generate a unique hash signature 118(2) for the validation status certificate 114(2) using a cryptographic key 120(2) in a similar manner as previously described with respect to the validation status certificate 114(1). The cryptographic key 120(2) may be a private key that is unique to the certifier application 104(2). The unique hash signature 118(2) is then stored in the network storage location in place of the hash signature 118(1). In some embodiments, the certifier application 104 (2) may be configured to automatically replace the hash signature 118(1) with the hash signature 118(2). In other embodiments, the replacement of the hash signature 118(1) by the hash signature 118(2) at the network storage location may be performed by the validation manager 106. Further, the validation manager 106 may store the validation status certificate 114(2) as signed with the hash signature 118(2) in the data store 122 of the validation manager 106 as a subsequent validation record in the validation record chain 124 for the particular version of the software package 108.

Subsequently, at the next control point, the validation manager 106 may direct a human operator of the certifier application 104(3) to perform a validation 112(3) of the particular version of the software package 108. In order to do so, the validation manager 106 may provide the certifier application 104(3) with a network address of the network storage location where the particular version of the software package 108 and the hash signature 118(2) are stored. Alternatively, the validation manager 106 may send the hash signature 118(2) to the certifier application 104(3) via a secure file transfer mechanism, while providing the certifier application 104(3) with a network address of the network storage location via the secure communication session. Further, validation manager 106 may trigger the certifier application 104(3) to notify the human operator to perform a test. The notification may take the form of a user interface notification message or a data message addressed to the human operator. For example, the data message may be an email message, a text message, or another type of message.

Accordingly, the human operator may use the certifier application 104(3) to access the particular version of the software package 108 that is stored at the network storage location. In various embodiments, the human operator may use the certifier application 104(3) and/or other software tools to examine the operation of the particular version, review the source code and/or executable code of the particular version, review the third-party add-on software of the particular version, and/or so forth. For example, the human operator may perform a user acceptance test on the particular version of the software package 108. Thus, the particular version of the software package 108 is deemed to have met a validation requirement when the particular version passes the user acceptance test. The human operator may use a user interface control of the certifier application 104(3) to notify the application that the validation requirement is met. As a result, the certifier application 104(3) may generate a validation status certificate 114(3) that indicates that the particular version of the software package 108 has met the validation requirement. The body 116(3) of the validation status certificate 114(3) may include data regarding the executed validation, such as the identifier of the certifier application 104(3), identification information of the one or more tests performed, the results of such tests, and/or an indication of whether the particular version meets a requirement. Further, the certifier application 104(3) may embed the hash signature 118(2) in the validation status certificate 114(3). Subsequently, the certifier application 104(3) may generate a unique hash signature 118(3) for the validation status certificate 114(3) using a cryptographic key 120(3) in a similar manner as previously described. The cryptographic key 120(3) may be a private key that is unique to the certifier application 104(3). The unique hash signature 118(3) is then stored in the network storage location in place of the hash signature 118(2) either directly by the certifier application 104(3) or by the validation manager 106 in a similar manner as previously described. Further, the validation manager 106 may store the validation status certificate 114(3) as signed with the hash signature 118(3) in the data store 122 of the validation manager 106 as a subsequent validation record in the validation record chain 124 for the particular version of the software package 108.

Subsequently, at the next control point, the validation manager 106 may direct a human operator of the certifier application 104(4) to perform a validation 112(4) of the particular version of the software package 108 in a similar manner as with respect to the human operator of the certifier application 104(3). For example, the human operator may perform a certification of the particular version of the software package 108. Thus, the particular version of the software package 108 is deemed to have met a validation requirement when the particular version is granted a certification. For example, the certification may be a financial certification, a regulatory certification, a release certification, or some other compliance certification. In various embodiments, the human operator may use the certifier application 104(4) and/or other software tools to examine the operation of the particular version, review the source code and/or executable code of the particular version, review the third-party add-on software of the particular version, and/or so forth for the purpose of granting the certification.

The human operator may use a user interface control of the certifier application 104(4) to notify the application that the validation requirement is met. As a result, the certifier application 104(4) may generate a validation status certificate 114(4) that indicates that the particular version of the software package 108 has met the validation requirement. The body 116(4) of the validation status certificate 114(4) may include data regarding the executed validation, such as the identifier of the certifier application 104(4), identification information of the one or more tests performed, the results of such tests, and/or an indication of whether the particular version meets a requirement. Further, the certifier application 104(4) may embed the hash signature 118(3) in the validation status certificate 114(4). Subsequently, the certifier application 104(4) may generate a unique hash signature 118(4) for the validation status certificate 114(4) using a cryptographic key 120(3) in a similar manner as previously described. The cryptographic key 120(4) may be a private key that is unique to the certifier application 104(4). The unique hash signature 118(4) is then stored in the network storage location in place of the hash signature 118(3) either directly by the certifier application 104(4) or by the validation manager 106 in a similar manner as previously described. Further, the validation manager 106 may store the validation status certificate 114(4) as signed with the hash signature 118(4) in the data store 122 of the validation manager 106 as a subsequent validation record in the validation record chain 124 for the particular version of the software package 108. Thus, assuming that the validation performed by the certifier application 104(4) is the last validation, the validation record chain 124 is complete.

In alternative instances, the completion of the validation record chain 124 may be brought about by a determination at a specific control point that the particular version of the software package 108 failed to meet a corresponding requirement. For example, if the particular version of the software package 108 fails a test or fails a certification at the validation 112(4), the failure may result in the software build platform 102 generating an updated version of the software package 108. However, even if a new version is generated, the validation record chain 124 is retained as evidence of the failure for the particular version.

In some embodiments, a certifier application may be operated by a distributor of the particular version of the software package 108. For example, such a certificate application may generate a signed validation status certificate indicating that the particular version is electronically delivered to a particular destination. The destination may be a computing device of an end user, a destination data store, and/or so forth. The destination may be identified by a device identifier, an IP address, a URL, a file directory path, and/or so forth. Such a certification in the validation record chain may ensure that a copy of the software package 108 that reaches an end user has not been tampered with during distribution.

In other embodiments, a validation status certificate generated by a subsequent certifier application may also explicitly revoke a prior validation status certificate in a validation record chain. For example, a particular version of the software package 108 may include a third-party software add-on that is initially certified by a certifier application as meeting a requirement via a signed validation status certificate. The signed validation status certificate is included in the validation record chain 124. However, the third-party software add-on may be later removed from a whitelist of approved software or added to a blacklist of unapproved software. Accordingly, a certifier application that is authorized by the validation manager 106 may generate a new signed validation status certificate indicating that the third-party software add-on is no longer invalid, i.e., does not meet a requirement. The new validation status certificate is appended to the end of the validation record chain 124 for the particular version of the software package 108. In essence, the newly signed validation status certificate revokes the prior signed validation status certificate. In additional embodiments, a signed validation status certificate that is included in the validation record chain 124 may have a built-in expiration date. For example, a validation status certificate indicating that the particular version of the software package 108 meets a specific regulatory requirement may be set to expire at a certain date, in which a new version of the regulatory requirement is known to take effect on the certain date. In such embodiments, the validation record chain 124 may show that the particular version of the software package 108 is invalid when a validity check of the particular version is conducted after the built-in expiration date of the validation status certificate. Thus, while the example validation record chain 124 is shown in FIG. 1 as having validation status certificates 114(1)-114(4), a validation record chain generated by the validation manager 106 may have any number of multiple validation status certificates. Accordingly, the number and type of validation status certificates in the validation record chain 124 is intended to be illustrative rather than limiting.

In some embodiments, the validation manager 106 be configured to confirm all hash and signatures associated with previous validations prior to initiating a subsequent validation. For example, the validation manager 106 may confirm that the hash 110 is valid prior to directing the certifier application 104(1) to perform the validation 112(1). For example, the validation manager 106 may request that the software build platform 102 recompute and/or resend an additional hash for the software package 108 for storage in the network storage, so that the validation manager 106 may compare the additional hash to the hash 110. Thus, the validation manager 106 may direct an initial certifier application to perform a validation when the additional hash and the hash 110 match. Further, the validation manager 106 may request that each prior certifier application that has generated a validation status certificate in the validation record chain 124 to recompute a hash signature and then compare the recomputed hash signature to a hash signature stored in a subsequent validation status certificate. Accordingly, the validation manager 106 may direct a subsequent validation application to proceed when each pair of the recomputed hash signature and hash signature stored in a subsequent validation status certificate match.

In additional embodiments, the validation manager 106 may be configured to generate a human-readable report based on the data in the validation status certificates of a validation record chain. The human-readable report provides the states of a corresponding software package version as the version progresses though each validation. Each state may include information such as one or more tests performed, the results of such tests, and/or an indication of whether the version of the software package meets a requirement of each validation. The validation manager 106 may store such human-readable reports for access by a user through a dashboard application.

Figure 2:
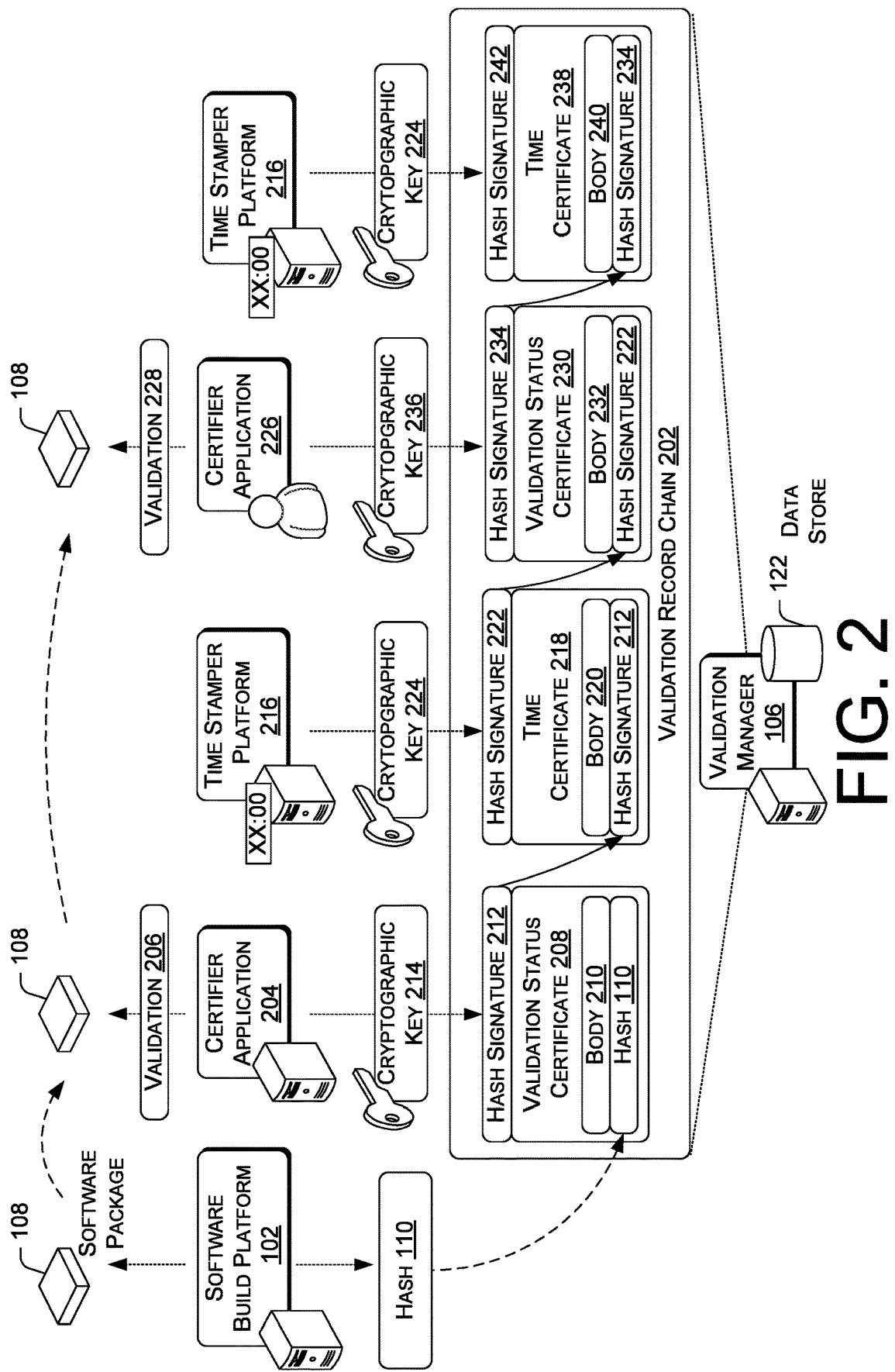
FIG. 2 illustrates an example validation record chain that uses digitally signed validation status certificates from certifiers and digitally signed time certificates for the validation status certificates to store the development provenance of a software package in a tamper-resistant manner.

FIG. 2 illustrates an example validation record chain that uses digitally signed validation status certificates from certifiers and digitally signed time certificates for the validation status certificates to store the development provenance of a software package in a tamper-resistant manner. The validation record chain 202 is an alternative form of a validation record chain as generated by the validation manager 106. The architecture shown in FIG. 2 is similar to the example architecture 100 illustrated in FIG. 1. Initially, the software build platform 102 may build a particular version of a software package 108 based on a set of source code. The software build platform 102 may be further configured to generate a hash 110 for the particular version of the software package 108. etc. The software building platform 102 may store the software package 108 and the hash 110 at a network storage location that is known to the validation manager 106. Subsequently, the validation manager 106 may direct the certifier application 204 to perform a validation 206 of the particular version of the software package 108. Subsequently, the certifier application may generate a validation status certificate 208 that contains a body 210 and the hash 110 of the particular version of the software package 108. The body 210 of the validation status certificate 208 may include data regarding the executed validation, such as the identifier of the certifier application 104(1), identification information of the one or more tests performed, the results of such tests, and/or an indication of whether the particular version meets a requirement. The validation status certificate 208 may be signed with a hash signature 212 using the cryptographic key 214 of the certifier application 204. The hash signature 212 is stored in the network storage location in place of the hash 110. Further, the validation manager 106 may store the validation status certificate 208 as signed with the hash signature 212 in a data store 122.

Subsequently, the validation manager 106 may direct a time stamper platform 216 to generate a time certificate for the validation status certificate 208. The time stamper platform 216 may be a trusted third-party that is acting as a Time Stamping Authority (TSA). The time certificate may certify that the validation status certificate is generated at a specific time and date. The time stamper platform 216 may have an accurate internal data and time clock that is used to issue the time certificate. The validation manager 106 may provide the time stamper platform 216 with access to the validation status certificate 208 and the hash signature 212. In some embodiments, the validation manager 106 may provide the time stamper platform 216 with a network address of the data store 122 and a network address of the network storage location where the hash signature 212 is stored. In this way, the time stamper platform 216 may access the information. In some instance, the time stamper platform 216 may provide an authentication mechanism of the data store 122 and/or the network storage location to access the information. In other embodiments, the validation manager 106 may send the validation status certificate 208 and/or the hash signature 212 to the time stamper platform 216 via a secure file transfer mechanism. In turn, the time stamper platform 216 may authenticate the validation status certificate 208. In various embodiments, the authentication may involve the time stamper platform 216 independently calculating a hash for the validation status certificate 208 using an identical hash algorithm. The time stamper platform 216 then compares the calculated hash to the hash signature 212. Accordingly, the time stamper platform 216 may determine that the validation status certificate 208 is authenticated when the calculated hash matches the hash signature 212. Otherwise, the time stamper platform 216 may determine that the authentication of the validation status certificate 208 failed.

Once the validation status certificate 208 is authenticated, the time stamper platform 216 may issue a time certificate 218 for the validation status certificate 208. The time certificate 218 may contain the hash signature 212 and a body 220. The body 220 may include a time stamp that is assigned to the validation status certificate 208. For example, the time stamp may indicate a date and time of when the validation status certificate 208 is received by the time stamper platform 216, a date and time of when the validation status certificate 208 is authenticated, or a date and time of when the time certificate 218 is issued. In some embodiments, the time stamper platform 216 may generate a unique event identifier (e.g., an authentication transaction number) for the authentication of the validation status certificate 218. The time stamper 216 may store the event identifier in the body 220 of the time certificate 218, as well as mark the validation status certificate 208 with the event identifier. Accordingly, these two instances of the event identifier may be used by the time stamper platform 216 to cross-check the hash signature 212 as stored in the validation status certificate 208 and the time certificate 218.

Subsequently, the time stamper platform 216 may sign the time certification 218 with a unique hash signature 222 using a cryptographic key 224. The cryptographic key 224 may be a private key that is unique to the time stamper platform 216. In various embodiments, the hash signature 222 is created by calculating a hash of the time certificate 218 via a hashing algorithm (e.g., HMAC, SHA256, RSASSA-PSS, etc.), and then encrypting the hash with the cryptographic key 224 to generate the hash signature 222. The unique hash signature 222 is then stored in the network storage location in place of the hash signature 212. In some embodiments, the time stamper platform 216 may be configured to automatically replace the hash signature 212 with the hash signature 222 at the network storage location. In other embodiments, the time stamper platform 216 may send the hash signature 222 to the validation manager 106 via a secure communication session. In turn, the validation manager 106 may store the hash signature 222 at the network storage location. Further, the validation manager 106 may store the time certificate 218 as signed with the hash signature 222 as a subsequent validation record in the validation record chain 202. In some embodiments, the time stamper platform 216 may be directed by the validation manager 106 to save the signed time certificate 218 in the data store 122. In other embodiments, the time stamper platform 216 may send the signed time certificate 218 to the validation manager 106 via a secure communication session. In turn, the validation manager 106 may store the signed time certificate 218 in the data store 122.

Subsequently, at the next control point, the validation manager 106 may direct a human operator of the certifier application 226 to perform a validation 228 of the particular version of the software package 108. Accordingly, the human operator may use a user interface control of the certifier application 226 to notify the application that the validation requirement of the validation 228 is met. As a result, the certifier application 226 may generate a validation status certificate 230 that indicates that the particular version of the software package 108 has met the validation requirement. The body 232 of the validation status certificate 230 may include data regarding the executed validation, such as the identifier of the certifier application 226, identification information of the one or more tests performed, the results of such tests, and/or an indication of whether the particular version meets a requirement. Further, the certifier application 104(4) may embed the hash signature 222 of the time certificate 218 in the validation status certificate 230. Subsequently, the certifier application 104(4) may generate a unique hash signature 234 for the validation status certificate 230 using a cryptographic key 236 that is unique to the certifier application 226. The unique hash signature 234 is then stored in the network storage location in place of the hash signature 222 either directly by the certifier application 226 or by the validation manager 106. Further, the validation manager 106 may store the validation status certificate 230 as signed with the hash signature 234 in the data store 122 of the validation manager 106 as a subsequent validation record in the validation record chain 202 for the particular version of the software package 108.

Subsequently, the validation manager 106 may direct a time stamper platform 216 to generate a time certificate for the validation status certificate 230 in a similar manner as for the validation status certificate 208. Thus, once the validation status certificate 230 is authenticated by the time stamper platform 216, the time stamper platform 216 may issue a time certificate 238 for the validation status certificate 230. The time certificate 238 may contain the hash signature 234 and a body 240. The body 240 may include a time stamp that is assigned to the validation status certificate 230. In some embodiments, the time stamper platform 216 may also generate the two instances of another unique event identifier for marking the validation status certificate 230 and storage in the body 240 of the time certificate 238 in a similar manner as described above.

Subsequently, the time stamper platform 216 may sign the time certificate 238 with a unique hash signature 242 using the cryptographic key 224 that is unique to the time stamper platform 216. The unique hash signature 242 is then stored in the network storage location in place of the hash signature 234. Further, the validation manager 106 may store the time certificate 238 as signed with the hash signature 242 as a subsequent validation record in the validation record chain 202. In this way, each of the time certificates may serve to prove that a corresponding validation status certificate is issued before a certain point in time, thereby proving a chain of provenance for the validation records. Further, while the example validation record chain 202 is shown in FIG. 2 as having validation status certificates 208 and 230 and time certificates 218 and 238, a validation record chain generated by the validation manager 106 may have any number of multiple validation status certificates, as well as multiple time certificates for those validation status certificates. Accordingly, the validation record chain 202 is intended to be illustrative rather than limiting.

Example Computing Components

Figure 3:
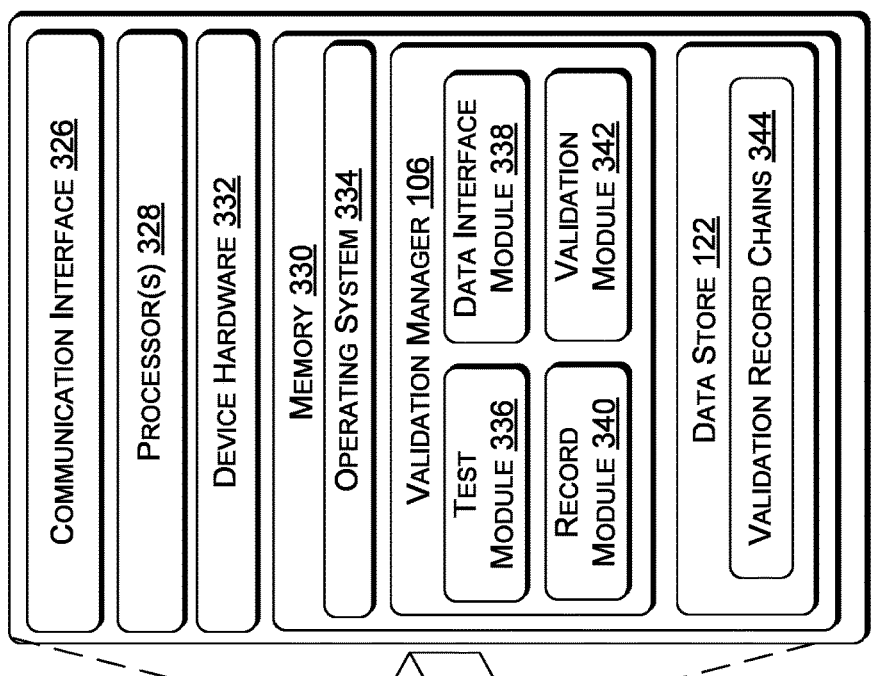
FIG. 3 is a block diagram showing various components of a certifier application that executes on a client device, as well as various components of a validation manager that maintains valid record chains.
Figure 3:
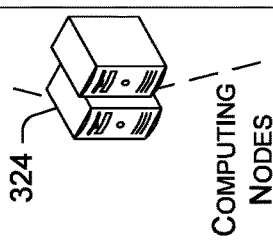
Figure 3:
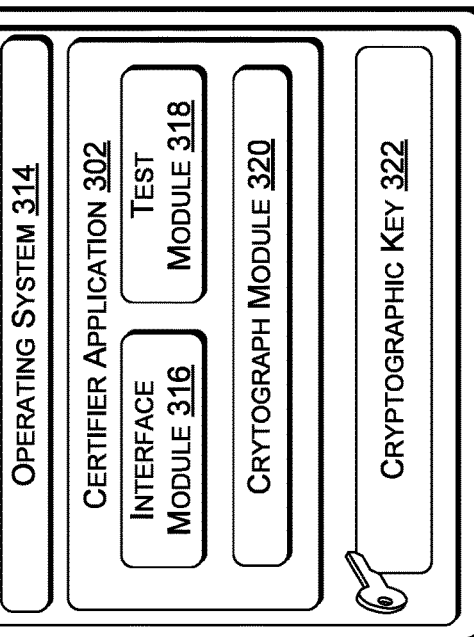
Figure 3:
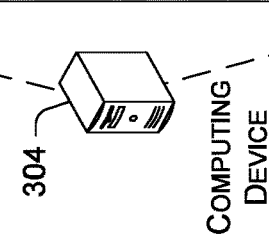

FIG. 3 is a block diagram showing various components of a certifier application that executes on a client device, as well as various components of a validation manager that maintains valid record chains. In various embodiments, a certifier application 302 may execute on a computing device 304. The computing device 304 may include a communication interface 306, a user interface 308, one or more processors 310, and memory 312. The communication interface 306 may include wireless and/or wired communication components that enable the electronic device to transmit or receive voice or data communication via a wireless carrier network, as well as other telecommunication and/or data communication networks. The user interface 308 may enable a user to provide inputs and receive outputs from the computing device 304. The user interface 308 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 312 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission or non-transitory medium that can be used to store information for access by a computing device. In contrast, communication media may embody computer-readable instructions, data structures, program modules, or other data in a modulated data signal, such as a carrier wave, or other transmission mechanisms.

The computing device 304 may also include communication transceivers and additional device hardware. The communication transceivers are hardware components that enable the computing device 304 to perform telecommunication and data communication with the multiple communications network, such as the wireless carrier network and a remote network. The device hardware may include signal converters, transceivers, antennas, hardware decoders and encoders, graphics processors, a SIM card slot, and/or the like that enable the computing device 304 to execute applications and provide telecommunication and data communication functions.

The one or more processors 310 and the memory 312 of the computing device 304 may implement an operating system 314 and the certifier application 302. The various software and applications may include routines, program instructions, code segments, objects, and/or data structures that perform particular tasks or implement particular abstract data types. The operating system 314 may include components that enable the computing device 304 to receive and transmit data via various interfaces (e.g., user controls, communication interface 306, and/or memory input/output devices). The operating system 314 may also process data using the one or more processors 310 to generate outputs based on inputs that are received via the user interface 308. For example, the operating system 314 may provide an execution environment for the execution of the certifier application 302. The operating system 314 may include a presentation component that presents the output (e.g., display the data on an electronic display, store the data in memory, transmit the data to another electronic device, etc.).

The operating system 314 may include an interface layer that enables applications to interface with the communication interface 306. The interface layer may comprise public APIs, private APIs, or a combination of both public APIs and private APIs. Additionally, the operating system 314 may include other components that perform various other functions generally associated with an operating system.

The certifier application 302 may include an interface module 316, a test module 318, and a cryptograph module 320. Each of these modules may include routines, program instructions, code segments, objects, and/or data structures that perform particular tasks or implement particular abstract data types. The interface module 316 may provide an API that can be called by the validation manager 106 to start a validation of a version of a software package, such as the software package 108. In turn, the interface module 316 may retrieve or receive a hash of a software package and a hash signature for incorporation into a validation status certificate that is generated by the certifier application 302, as well as provide access to the version of the software package. In some instances, the interface module 316 may establish secure communication sessions with computing nodes that store such data using authentication credentials of the certifier application 302. The interface module 316 may also initiate the test module 318 to either perform a validation test or prompt a human operator to perform a validation test or certification. Following the generation of a signed validation status certificate by the cryptograph module 320, the interface module 316 may provide the validation manager 106 with access to the signed validation status certificate and the corresponding hash signature by sending the data to secure storage locations designated by the validation manager or sending the data to the validation manager 106 via secure communication sessions.

In some embodiments, the test module 318 may be initiated by the interface module 316 to perform an automated validation test on the version of the software package. The automated validation test may be a unit test, a code quality test, a security test, etc. that determines whether the version of the software meets a requirement. Accordingly, the test module 318 may generate a validation status certificate when the requirement is met. In other embodiments, the test module 318 may be initiated by the interface module 316 to prompt a human operator to perform a manual test or certification to determine whether a validation requirement is met. The prompts may include messages that are displayed via a user interface control of the test module 318. For example, the manual test may be a user acceptance test, a performance test, a business acceptance test, etc. The certification may be a financial certification, a regulatory certification, a release certification, or some other compliance certification. In some instances, the test module 318 may provide the human operator with access to additional software analytic tools for performing the manual test or certification. The human operator may use the user interface control to notify the test module 318 whether the requirement is met. Accordingly, the test module 318 may generate a validation status certificate when the requirement is met. Depending on the directive of the validation manager 106, the validation status certificate that is generated by the certifier application 302 may contain a hash of the version of the software package being validated or a hash signature of a previously generated validation status certificate. The cryptograph module 320 may generate a hash signature for a validation status certificate produced by the test module 318. In various embodiments, the hash signature is created by calculating a hash of the validation status certificate via a hashing algorithm (e.g., HMAC, SHA256, RSASSA-PSS, etc.), and then encrypting the hash with the cryptographic key 322 of the certifier application 302 to generate the hash signature. In some embodiments, the cryptographic key 322 may be stored in a secure memory location of the computing device 304. However, in other embodiments, the cryptographic key 322 may be stored on an external storage device, a hardware security module, or other types of hardware designed specifically to store such keys.

The validation manager 106 may execute on one or more computing nodes 324. The computing nodes 324 may include any electronic devices that are capable of receiving inputs, processing the inputs, and generating output data. In other embodiments, the computing nodes 324 or components thereof may be virtual computing devices in the form of virtual machines or software containers that are hosted in a computing cloud. The computing nodes 324 may include a communication interface 326, one or more processors 328, memory 330, and device hardware 332. The communication interface 326 may include wireless and/or wired communication components that enable the computing nodes 324 to transmit data to and receive data from other networked devices. The device hardware 332 may include additional hardware interfaces, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 330 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission or non-transitory medium that can be used to store information for access by a computing device. In contrast, communication media may embody computer-readable instructions, data structures, program modules, or other data in a modulated data signal, such as a carrier wave, or other transmission mechanisms.

The processors 328 and the memory 330 of the computing nodes 324 may implement an operating system 334 and the validation manager 106. The operating system 334 may include components that enable the computing nodes 324 to receive and transmit data via various interfaces (e.g., user controls, communication interface, and/or memory input/output devices), as well as process data using the processors 310 to generate output. The operating system 334 may include a presentation component that presents the output (e.g., display the data on an electronic display, store the data in memory, transmit the data to another electronic device, etc.). Additionally, the operating system 334 may include other components that perform various additional functions generally associated with an operating system.

The validation manager 106 may include a test module 336, a data interface module 338, a record module 340, and a validation module 342. Each of these modules may include routines, program instructions, code segments, objects, and/or data structures that perform particular tasks or implement particular abstract data types. The test module 336 may initiate various validations that are to be performed on versions of software packages. Each of the validations may include a series of validation tests that are performed by multiple certifier applications. The validation tests to be performed in each validation of a version of a software package may be configured by a human operator using a user interface control. Accordingly, the test module 336 may initiate a validation for a particular version of a software package when the validation manager 106 receives a notification from the software building platform 102 that the particular version is ready for validation.

The data interface module 338 may direct multiple certifier applications to perform the validation tests. For example, the data interface module 338 may call an API of a particular certifier application to initiate a test. The data interface module 338 is responsible for providing a certifier application with access to a version of the software package, a hash of the version of the software package, and/or a hash signature of another validation status certificate so that the certifier application is able to generate a corresponding signed validation status certificate. Additionally, the data interface module 338 may receive signed certificates, such as signed validation status certificates and time certificates, for storage in the data store 122. The data interface module 338 may perform such functions by sending a network address of a network storage location to the certifier application or using secure communication sessions to transmit data to and receive data from a certifier application and a time stamper platform.

The record module 340 may generate a validation record chain for a particular version of a software package by storing the corresponding signed certification, such as corresponding signed validation status certificates, or a combination of corresponding signed validation status certificates and signed time certificates, into the data store 122 as a validation record chain. In various embodiments, the record module 340 may store an initial signed validation status certificate for a particular version of a software package, then append each subsequent signed certificate that is received for the particular version to a prior signed certification. In various embodiments, the record module 340 may perform such storage of signed certificates for a validation record chain by sequentially storing the signed certificates in a corresponding data list or a data array reserved for the validation record chain. Accordingly, the record module 340 may store multiple validation record chains 344 in the data store 122. In some embodiments, the record module 340 may also generate human-readable reports that provide the states of a corresponding software package versions at various validation points for viewing via a dashboard application.

The validation module 342 may receive requests to validate copies of software packages. In various embodiments, such requests may originate from a computing device of an end user, a regulatory agency, an internal auditor of the software developer, etc. A request may include a build identifier for a particular version of a software package that is used by the validation module 342 to locate the original validation record chain from the data store 122. For example, the build identifier may include a major release number, a minor release number, a revision number, a patch number and/or so forth. In some instances, the request may further include a hash for the particular version of the software package that is generated from the source code or the binary code of the version. In such instances, the validation module 342 may extract the hash from the request. In other instances, the request may include a pointer to a network location where the particular version is stored. In such instances, the validation module 342 may access the particular version of the software package at the network location to execute a hashing algorithm on the source code or the binary code of the particular version to generate a hash of the particular version.

The validation module 342 may make a determination as to whether the hash is identical to a corresponding hash in an initial validation status certificate of the original validation record chain. Thus, if the hash is identical to the corresponding hash in the initial validation status certificate, the validation module 342 may parse the signed validated certificates in the original validation record chain to determine whether the particular version of the software package is valid. For example, the validation module 342 may determine that the particular version is valid if the signed validation status certificates indicate that the particular version meets all requirements. However, the validation module 342 may determine that the particular version is invalid if at least one of the signed validation status certificates indicates that the particular version did not meet or no longer meets one or more requirements.

In other embodiments, a validation record chain may include both validation status certificates and corresponding time certificates. In such embodiments, the validation module 342 may use the time and date stamps in the time certificates to determine that the validation status certificates in the validation record chain were issued sequentially in accordance with the set of control points in a corresponding validation configuration file. Following such temporal sequence validation, the validation module 342 may use the validation status certificates to determine whether the particular version meets all requirements. Thus, the validation module 342 may determine that the particular version is invalid when any time certificate indicates that a corresponding validation status certificate is issued out of sequence with respect to the control points, or any validation status certificate indicates a requirement is not met. Otherwise, the validation module 342 may determine that the particular version is valid. In some embodiments, the validation module 342 may reside on another computing device separate from the validation manager 106. In other words, instead of the validation manager 106 being the validation authority, the functions performed by the validation module 342 may be performed by another computing device acting as a validation authority.

Example Processes

Figure 4:
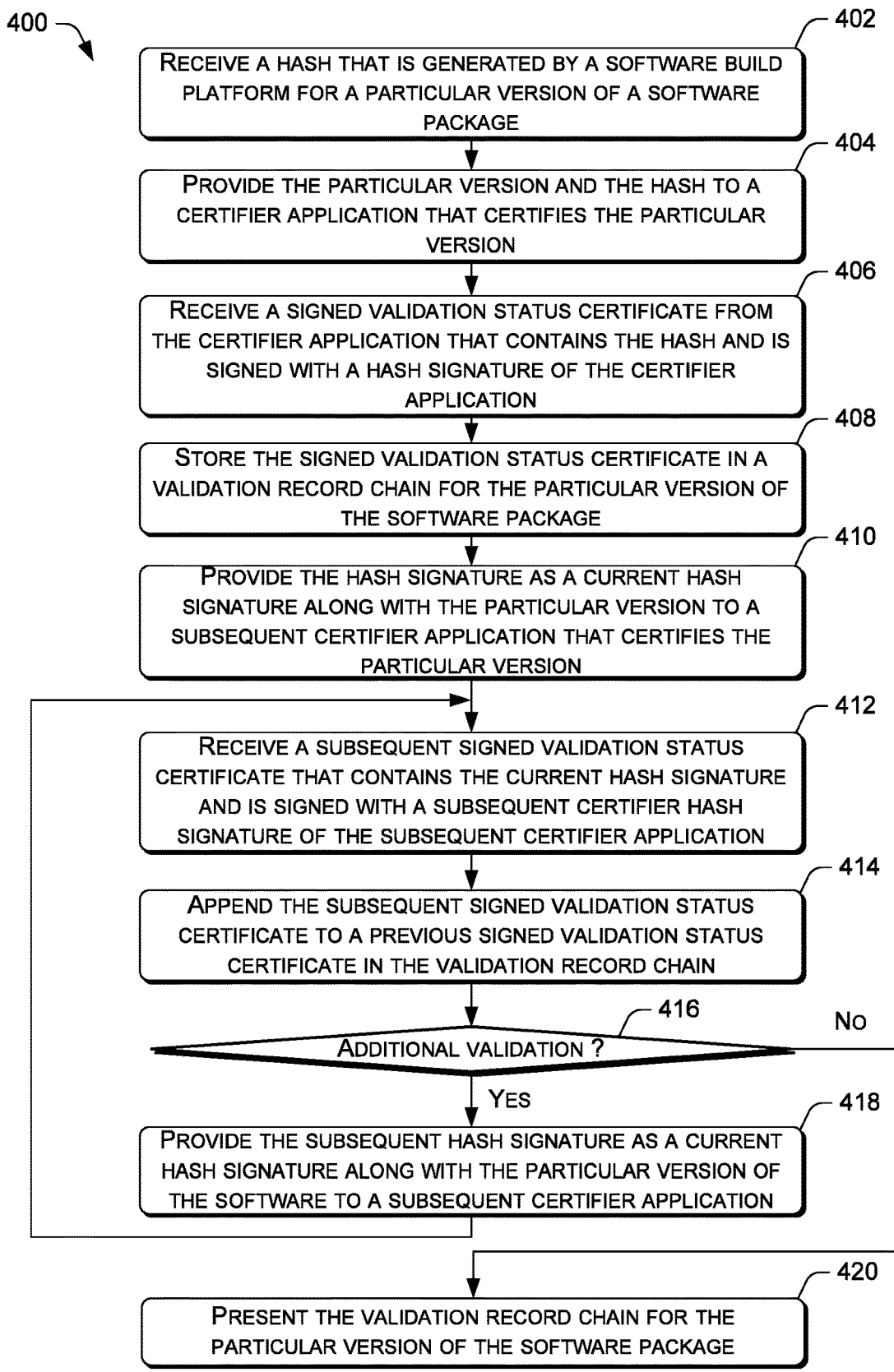
FIG. 4 is a flow diagram of an example process for generating a validation record chain that uses digitally signed validation status certificates from certifiers to store the development provenance of a software package in a tamper-resistant manner.
Figure 5A:
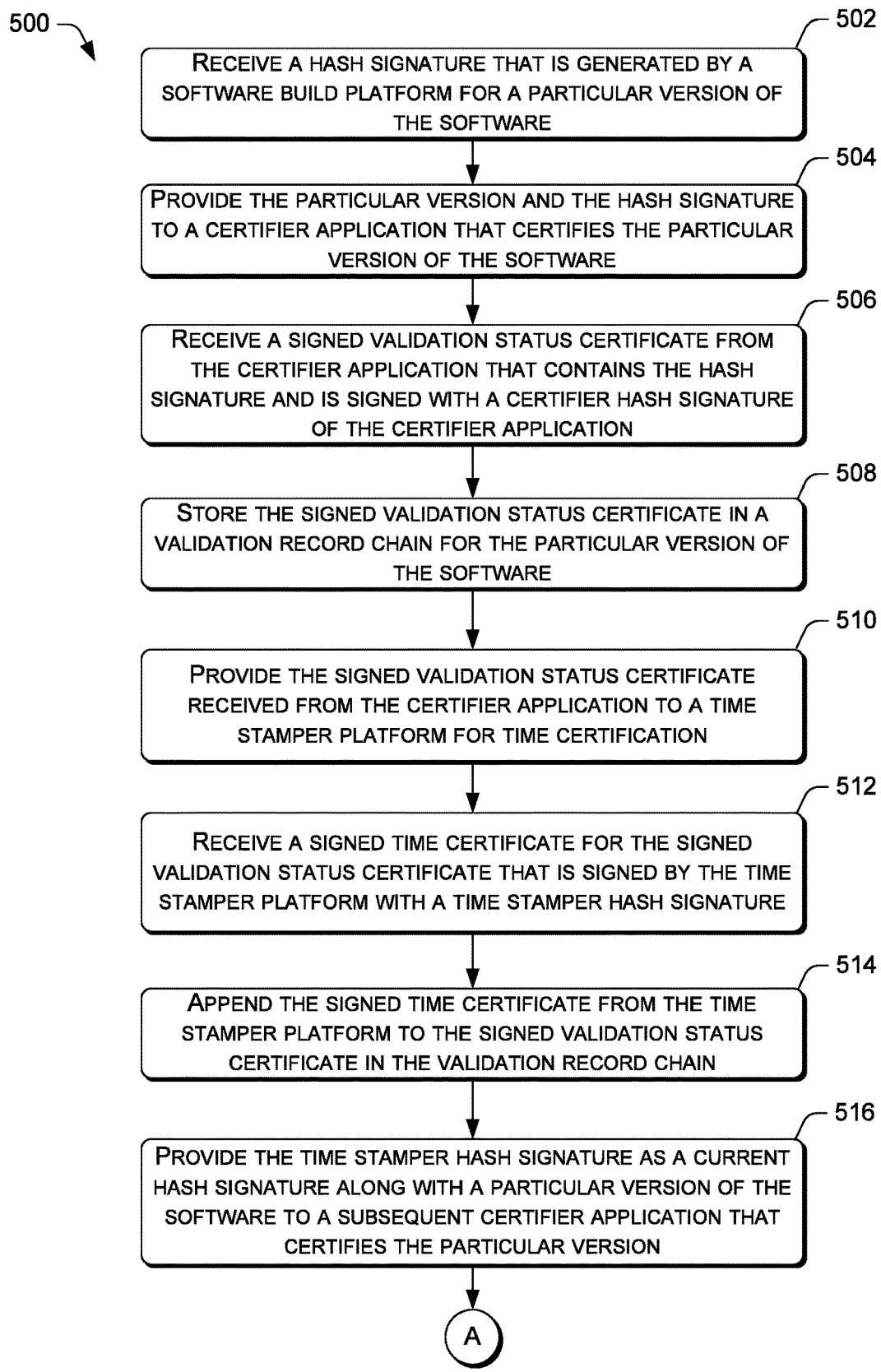
FIGS. 5a and 5b show a flow diagram of an example process for generating a validation record chain that uses digitally signed validation status certificates from certifiers and digitally signed time certificates for the validation status certificates to store the development provenance of a software package in a tamper-resistant manner.
Figure 5B:
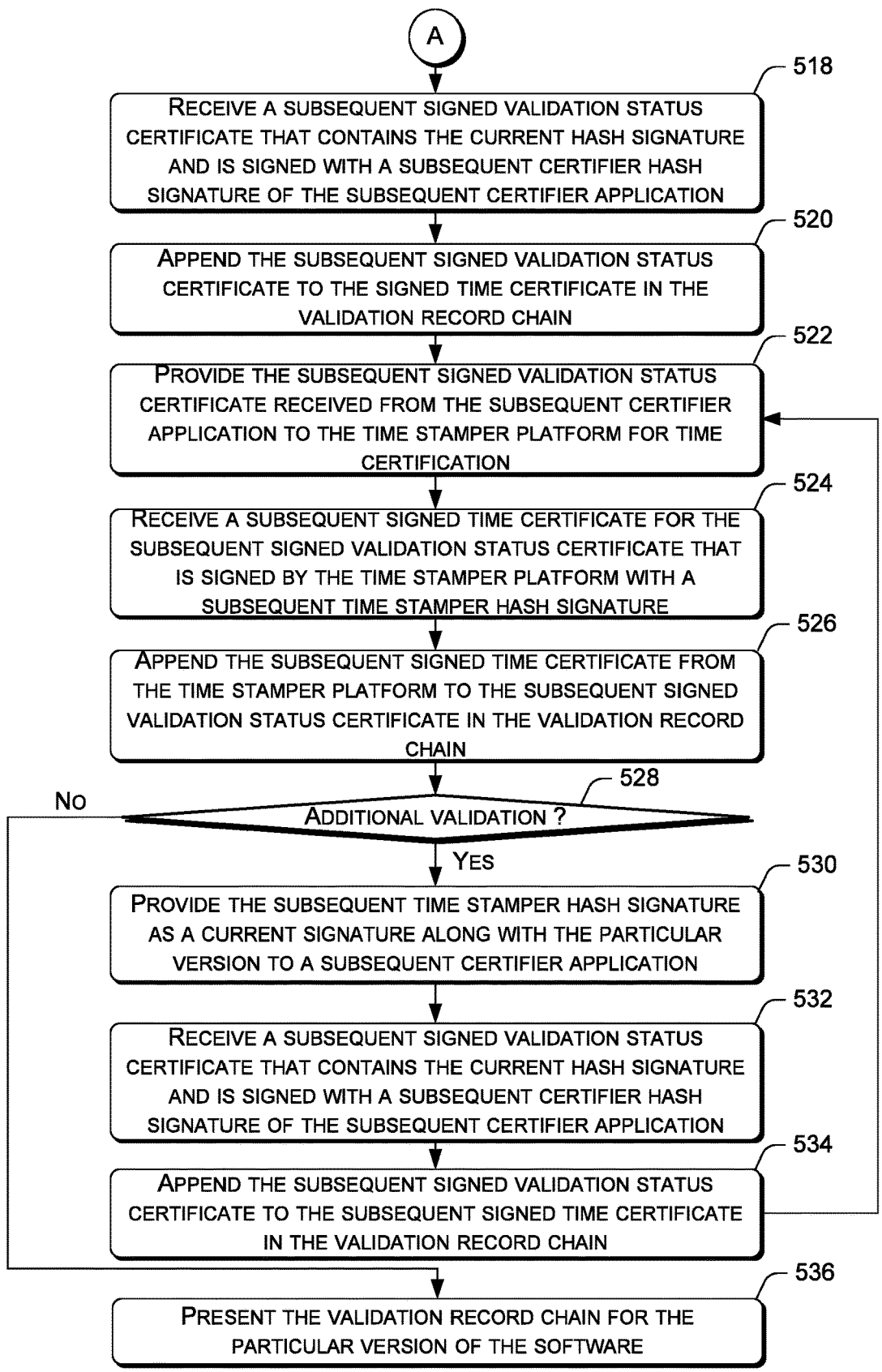
Figure 6:
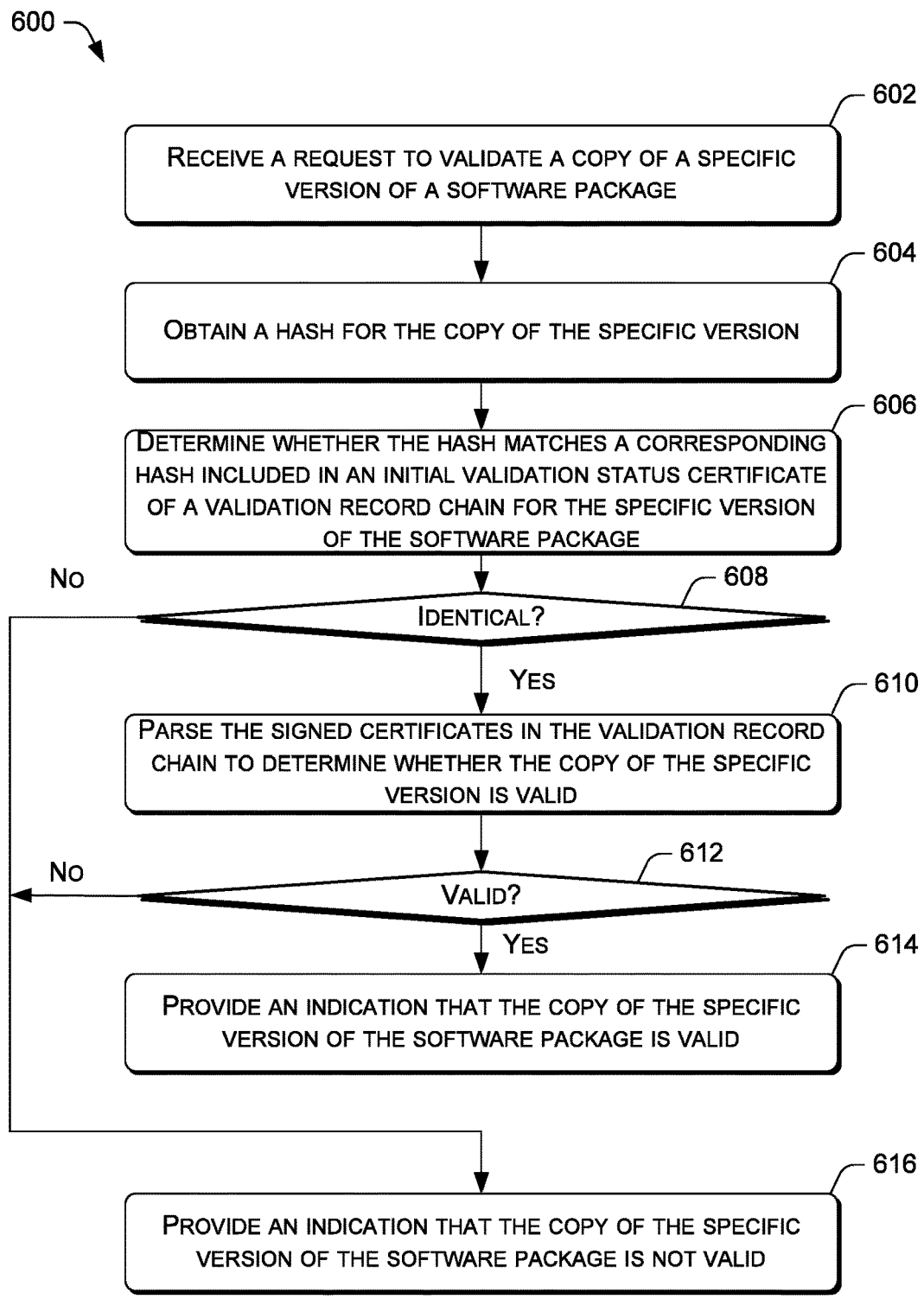
FIG. 6 is a flow diagram of an example process for using a validation record chain to verify the authenticity of a software package.

FIGS. 4-6 present illustrative processes 400-600 for using a validation record chain to store the development provenance of a software package in a tamper-resistant manner. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIG. 4 is a flow diagram of an example process 400 for generating a validation record chain that uses digitally signed validation status certificates from certifiers to store the development provenance of a software package in a tamper-resistant manner. At block 402, the validation manager 106 may receive a hash that is generated by the software build platform 102 for a particular version of the software package 108. In various embodiments, the hash may be generated based on the source code of the software package 108 or on the binary code of the software package 108. In some instances, the source code or the binary code used to generate the hash may include third-party software code that is included in the software package 108, such as software tools, software libraries, software development kits (SDKs), etc.

At block 404, the validation manager 106 may provide the particular version and the hash to a certifier application that certifies the particular version of the software package 108. In various embodiments, the validation manager 106 may be loaded with a configuration file that controls the validation of the particular version. The configuration file may list a set of control points and the certifier applications that are responsible for providing the validation status certificates at the control points. In some embodiments, the validation manager 106 may provide the certifier application 104 with a network address of the network storage location where the particular version of the software package 108 and the hash are stored. In other embodiments, the validation manager 106 may send the hash to the certifier application 104 via a secure file transfer mechanism, while providing the certifier application 104(1) with the network address of the network storage location via the secure communication session.

At block 406, the validation manager 106 may receive a signed validation status certificate from the certifier application that contains the hash and is signed with a hash signature of the certifier application. In various embodiments, the hash signature is created by calculating a hash of the validation status certificate via a hashing algorithm (e.g., HMAC, SHA256, RSASSA-PSS, etc.), and then encrypting the hash with the cryptographic key of the certifier application to generate the hash signature. At block 408, the validation manager 106 may store the signed validation status certificate in a validation record chain for the particular version of the software package 108. In some embodiments, the certifier application may be directed by the validation manager 106 to save the signed validation status certificate in a list or a data array configured to store the validation record chain. In other embodiments, the certifier application may send the signed validation status certificate 114 to the validation manager 106 via a secure communication session. In turn, the validation manager 106 may store the signed validation status certificate in the list or the data array.

At block 410, the validation manager 106 may provide the hash signature as a current hash signature along with the particular version of the software package 108 to a subsequent certifier application that certifies the particular version of the software package 108. In various embodiments, the validation manager 106 may provide the subsequent certifier application with a network address of the network storage location where the particular version of the software package and the current hash signature are stored. Alternatively, the validation manager 106 may send the current hash signature to the subsequent certifier application via a secure file transfer mechanism, while providing the subsequent certifier application with a network address of the network storage location via the secure communication session.

At block 412, the validation manager 106 may receive a subsequently signed validation status certificate that contains the current hash signature and is signed with a subsequent hash signature of the subsequent certifier application. In various embodiments, the subsequent hash signature is created by calculating a hash of the subsequent validation status certificate via a hashing algorithm, and then encrypting the hash with the cryptographic key of the subsequent certifier application to generate the subsequent hash signature. At block 414, the validation manager 106 may append the subsequent signed validation status certificate to a previous signed validation status certificate in the validation record chain. In some embodiments, the certifier application may be directed by the validation manager 106 to save the signed validation status certificate as a next entry in the list or the data array configured to store the validation record chain. In other embodiments, the certifier application may send the signed validation status certificate 114 to the validation manager 106 via a secure communication session. In turn, the validation manager 106 may store the signed validation status certificate as the next entry in the list or the data array.

At decision block 416, the validation manager 106 may determine whether there are additional validations to be performed. In various embodiments, the validation manager 106 may sequentially send the software package down the list of certifier applications in the configuration file until either the version of the software package has passed all the requirements, or a certifier application indicates that the version has failed a requirement. Accordingly, if the validation manager 106 determines that there are additional validations to be performed ("yes" at decision block 416), the process 400 may proceed to block 418.

At block 418, the validation manager 106 may provide the subsequent hash signature as a current hash signature along with the particular version of the software package 108 to a subsequent certifier application. Subsequently, the process 400 may loop back to block 412, so that the subsequent certifier application may add another signed validation status certificate to the validation record chain.

Returning to decision block 416, if the validation manager 106 determines that there are no additional validations to be performed ("no" at decision block 416), the process 400 may proceed to block 420. At block 420, the validation manager may present the validation record chain for the particular version of the software package.

FIGS. 5a and 5b show a flow diagram of an example process 500 for generating a validation record chain that uses digitally signed validation status certificates from certifiers and digitally signed time certificates for the validation status certificates to store the development provenance of a software package in a tamper-resistant manner. At block 502, the validation manager 106 may receive a hash that is generated by the software build platform 102 for a particular version of the software package 108. In various embodiments, the hash may be generated based on the source code of the software package 108 or on the binary code of the software package 108. In some instances, the source code or the binary code used to generate the hash may include third-party software code that is included in the software package 108, such as software tools, software libraries, software development kits (SDKs), etc.

At block 504, the validation manager 106 may provide the particular version and the hash to a certifier application that certifies the particular version of the software package 108. In various embodiments, the validation manager 106 may be loaded with a configuration file that controls the validation of the particular version. The configuration file may list a set of control points and the certifier applications that are responsible for providing the validation status certificates at the control points. In some embodiments, the validation manager 106 may provide the certifier application 104 with a network address of the network storage location where the particular version of the software package 108 and the hash are stored. In other embodiments, the validation manager 106 may send the hash to the certifier application 104 via a secure file transfer mechanism, while providing the certifier application 104(1) with the network address of the network storage location via the secure communication session.

At block 506, the validation manager 106 may receive a signed validation status certificate from the certifier application that contains the hash and is signed with a hash signature of the certifier application. In various embodiments, the hash signature is created by calculating a hash of the validation status certificate via a hashing algorithm (e.g., HMAC, SHA256, RSASSA-PSS, etc.), and then encrypting the hash with the cryptographic key of the certifier application to generate the hash signature. At block 508, the validation manager 106 may store the signed validation status certificate in a validation record chain for the particular version of the software package 108. In some embodiments, the certifier application may be directed by the validation manager 106 to save the signed validation status certificate in a list or a data array configured to store the validation record chain. In other embodiments, the certifier application may send the signed validation status certificate 114 to the validation manager 106 via a secure communication session. In turn, the validation manager 106 may store the signed validation status certificate in the list or the data array.

At block 510, the validation manager 106 may provide the signed validation status certificate received from the certifier application to a time stamper platform 216 for time certification. In some embodiments, the validation manager 106 may provide the time stamper platform 216 with network access to the signed validation status certificate and the hash signature of the validation status certificate. In other embodiments, the validation manager 106 may send the signed validation status certificate and the hash signature to the time stamper platform 216 via a secure file transfer mechanism. Accordingly, the time stamper platform 216 may authenticate the validation status certificate.

At block 512, the validation manager 106 may receive a signed time certificate for the signed validation status certificate, in which the time certificate is signed by the time stamper platform with a time stamper hash signature. The signed time certificate may certify that the signed validation status certificate is generated at a specific time and date. In various embodiments, the time stamper platform 216 may determine that such a validation status certificate is authenticated when a hash independently calculated by the time stamper platform for the validation status certificate matches the hash signature provided by the validation manager 106. The signed time certificate may contain the hash signature received from the validation manager 106 and is in turn signed with a unique hash signature generated using a cryptographic key of the time stamper platform 216.

At block 514, the validation manager 106 may append the signed time certificate from the time stamper to the signed validation status certificate in the validation record chain. In some embodiments, the time stamper platform 216 may be directed by the validation manager 106 to save the signed time certificate 218 as the next entry in the list or the data array configured to store the validation record chain. In other embodiments, the time stamper platform 216 may send the signed time certificate 218 to the validation manager 106 via a secure communication session. In turn, the validation manager 106 may store the signed time certificate 218 as the next entry in the list or the data array configured to store the validation record chain.

At block 516, the validation manager 106 may provide the time stamper hash signature as a current hash signature along with the particular version of the software package 108 to a subsequent certifier application that certifies the particular version of the software package 108. In various embodiments, the validation manager 106 may provide the subsequent certifier application with a network address of the network storage location where the particular version of the software package and the current hash signature are stored. Alternatively, the validation manager 106 may send the current hash signature to the subsequent certifier application via a secure file transfer mechanism, while providing the subsequent certifier application with a network address of the network storage location via the secure communication session.

At block 518, the validation manager 106 may receive a subsequently signed validation status certificate that contains the current hash signature and is signed with a subsequent certifier hash signature of the subsequent certifier application. In various embodiments, the subsequent hash signature is created by calculating a hash of the subsequent validation status certificate via a hashing algorithm, and then encrypting the hash with the cryptographic key of the subsequent certifier application to generate the subsequent hash signature.

At block 520, the validation manager 106 may append the subsequent signed validation status certificate to a previous signed validation status certificate in the validation record chain. In some embodiments, the certifier application may be directed by the validation manager 106 to save the signed validation status certificate as a next entry in the list or the data array configured to store the validation record chain. In other embodiments, the certifier application may send the signed validation status certificate to the validation manager 106 via a secure communication session. In turn, the validation manager 106 may store the signed validation status certificate as the next entry in the list or the data array.

At block 522, the validation manager 106 may provide the subsequent signed validation status certificate received from the subsequent certifier application to the time stamper platform for certification. In some embodiments, the validation manager 106 may provide the time stamper platform 216 with network access to the subsequent signed validation status certificate and the hash signature of the subsequent signed validation status certificate. In other embodiments, the validation manager 106 may send the signed validation status certificate and the hash signature to the time stamper platform 216 via a secure file transfer mechanism. Accordingly, the time stamper platform 216 may authenticate the validation status certificate.

At block 524, the validation manager 106 may receive a subsequent signed time certificate for the subsequent signed validation status certificate, in which the time certificate is signed by the time stamper platform with a subsequent time stamper hash signature. The subsequent signed time certificate may certify that the subsequent signed validation status certificate is generated at a specific time and date. In various embodiments, the time stamper platform 216 may determine that such a validation status certificate is authenticated when a hash independently calculated by the time stamper platform for the validation status certificate matches the hash signature of the validation status certificate provided by the validation manager 106. The subsequent signed time certificate may contain the hash signature received from the validation manager 106 and is in turn signed with a unique hash signature generated using cryptographic key of the time stamper platform 216.

At block 526, the validation manager may append the subsequent signed time certificate from the time stamper platform to the subsequent signed validation status certificate in the validation record chain. In some embodiments, the certifier application may be directed by the validation manager 106 to save the subsequent signed validation status certificate as a next entry in the list or the data array configured to store the validation record chain. In other embodiments, the certifier application may send the subsequent signed validation status certificate to the validation manager 106 via a secure communication session. In turn, the validation manager 106 may store the subsequent signed validation status certificate as the next entry in the list or the data array.

At decision block 528, the validation manager 106 may determine whether there are additional validations to be performed. In various embodiments, the validation manager 106 may sequentially send the software package down the list of certifier applications in the configuration file until either the version of the software package has passed all the requirements, or a certifier application indicates that the version has failed a requirement. Accordingly, if the validation manager 106 determines that there are additional validations to be performed ("yes" at decision block 528), the process 500 may proceed to block 530.

At block 530, the validation manager 106 may provide the subsequent hash signature as a current hash signature along with the particular version of the software package 108 to a subsequent certifier application. At block 532, the validation manager 106 may receive a subsequent signed validation status certificate that contains the current hash signature and is signed with a subsequent certifier hash signature of the subsequent certifier application.

At block 534, the validation manager 106 may append the subsequent signed validation status certificate to the subsequent signed time certificate in the validation record chain. Subsequently, the process 500 may loop back to block 522, so that the validation manager 106 may provide the subsequent signed validation status certificate received from the subsequent certifier application to the time stamper platform for time certification. Returning to decision block 528, if the validation manager 106 determines that there are no additional validations to be performed ("no" at decision block 528), the process 500 may proceed to block 536. At block 536, the validation manager 106 may present the validation record chain for the particular version of the software package.

FIG. 6 is a flow diagram of an example process 600 for using a validation record chain to verify the authenticity of a software package. At block 602, a validation authority may receive a request to validate a copy of a specific version of a software package. In various embodiments, the request may originate from a computing device of an end user, a regulatory agency, an internal auditor of the software developer, etc. The request may be sent via a network to the validation manager 106. The request may include a build identifier for a particular version of a software package that is used by the validation authority to locate the original validation record chain from a data store. For example, the build identifier may include a major release number, a minor release number, a revision number, a patch number and/or so forth.

At block 604, the validation authority may obtain a hash for the copy of the specific version. In some embodiments, the request may further include a hash for the particular version of the software package that is generated from the source code or the binary code of the version. Accordingly, the validation authority may extract the hash from the request. In other instances, the request may include a pointer to a network location where the particular version is stored. In such instances, the validation authority may access the particular version of the software package at the network location to execute a hashing algorithm on the source code or the binary code of the particular version to generate a hash of the particular version.

At block 606, the validation authority may determine whether the hash matches a corresponding hash included in an initial validation status certificate of a validation record chain for the specific version of the software package via a hash comparison function. At decision block 608, if the hash for the copy of the specific version is identical to the corresponding hash ("yes" at decision block 608), the process 600 may proceed to block 610. At block 610, the validation authority may parse the signed certificates in the validation record chain to determine whether the signed copy of the specific version is valid. In some instances, if the all the validation status certificates in the validation record chain indicate that the specific version meets all requirements, the validation authority may determine that the specific version is valid. Otherwise, if at least one validation status certificate indicates that the specific version did not meet one or more requirements, the validation authority may determine that the specific version is invalid.

In such embodiments, the validation authority may use the time and date stamps in the time certificates to determine that the validation status certificates in the validation record chain were issued sequentially in accordance with the set of control points in a corresponding validation configuration file. Following such temporal sequence validation, the validation authority may use the validation status certificates to determine whether the particular version meets all requirements. Thus, the validation authority may determine that the particular version is invalid when any time certificate indicates that a corresponding validation status certificate is issued out of sequence with respect to the control points, or any validation status certificate indicates a requirement is not met. Otherwise, the validation authority may determine that the particular version is valid.

At decision block 612, if the validation authority determines that the signed certificates indicate that the copy of the specific version is valid ("yes" at decision block 612), the process 600 may proceed to block 614. At block 614, the validation authority may provide an indication that the copy of the specific version of the software package is valid. In various embodiments, the indication may be sent by the validation authority to the computing device that requested the validation via the network.

Returning to decision block 608, if the hash for the copy of the specific version is not identical to the corresponding hash ("no" at decision block 608), the process 600 may proceed to block 616. At block 616, the validation authority may provide an indication that the copy of the specific version of the software package is not valid. In various embodiments, the indication may be sent by the validation authority to the computing device that requested the validation via the network. Returning to decision block 612, if the validation authority determines that the signed certificates indicate that the copy of the specific version in invalid ("no" at decision block 612), the process 600 may also proceed directly to block 616.

A validation record chain that is generated for a specific version of a software package may be used to verify the legitimacy of the specific version. Since each certificate in the validation record chain is protected by a hash signature that is embedded in a subsequent certificate, it is not possible to alter the content of any certificate without altering the hash signatures of the validation record chain. Accordingly, any tampering of the certificates in the validation record chain of a software package, or a misuse of a different validation record chain belonging to another software package as the validation record chain for the software package, is readily detectable by a mismatching hash signature. In this way, the validation and verification that a specific version of a software package is a legitimate version may be automated in a reliable and efficient manner. Further, the use of validation record chains may improve the productivity of software development by recording and ensuring that all criteria at control points are met.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions of a server application that upon execution cause one or more processors to perform acts comprising:
   receiving a hash that is generated by a software building platform for a particular version of a software package;
   generating a validation record chain for the particular version that includes a plurality of certificates such that a first certificate in the validation record chain contains the hash, and each of one or more subsequent certificates is signed with a corresponding hash signature of a corresponding certifier application and contains a prior hash signature of a previous certificate in the validation record chain, wherein the plurality of certificates in the validation record chain includes a validation status certificate issued by a certifier application for the particular version of the software package and a time certificate generated by a trusted time stamper platform for the validation status certificate, the time certificate certifying that the validation status certificate is issued by the certifier application at a specific date and a specific time; and
   storing the validation record chain for validation of the particular version of the software package via the plurality of certificates.

2. The one or more non-transitory computer-readable media of claim 1, wherein the validation status certificate certifying that the particular version of the software package meets a particular requirement, the particular requirement including passing an automated software test, passing a manual software test, complying with a government regulation, or satisfying a software development requirement.

3. The one or more non-transitory computer-readable media of claim 1, wherein the validation status certificate is signed with a hash signature that is generated using a unique cryptographic key of a corresponding certifier application.

4. The one or more non-transitory computer-readable media of claim 1, wherein the hash is generated based on source code of the software package or binary code of the software package.

5. The one or more non-transitory computer-readable media of claim 1, wherein the time certificate is signed with a hash signature that is generated using a unique cryptographic key of the trusted time stamper platform.

6. The one or more non-transitory computer-readable media of claim 1, wherein the acts further comprise:
   obtaining an additional hash for a copy of the particular version of the software package to be validated; and
   in response to the additional hash matching a corresponding hash included in an initial signed validation status certificate of a validation record chain for the particular version of the software package, validating the copy based on content of the plurality of certificates in the validation record chain.

7. The one or more non-transitory computer-readable media of claim 6, wherein the validating includes determining that the copy is valid when each of a plurality of validation status certificates in the validation record chain indicates that the particular version of the software package meets a corresponding requirement, or determining that the copy is invalid when at least one of the plurality of validation status certificates in the validation record chain indicates that the particular version of the software package fails to meet one or more requirements.

8. The one or more non-transitory computer-readable media of claim 7, wherein the validating includes determining that the copy is valid when a plurality of time certificates indicate that the plurality of validation status certificates are issued in sequence at corresponding validation control points, and each of the plurality of validation status certificates in the validation record chain indicates that the particular version of the software package meets a corresponding requirement.

9. The one or more non-transitory computer-readable media of claim 6, further comprising determining that the copy is invalid when the hash does not match the corresponding hash included in the initial signed validation status certificate.

10. The one or more non-transitory computer-readable media of claim 1, wherein the particular version of the software package includes third-party add-on software code, and wherein a validation status certificate certifies that the third-party add-on software code is on a white list of approved software.

11. The one or more non-transitory computer-readable media of claim 1, wherein the plurality of certificates in the validation record chain includes a final validation status certificate issued by a final certifier application, the final validation status certificate indicating that the particular version of the software package failed to meet a corresponding requirement.

12. A computer-implemented method, comprising:
   receiving, at one or more computing devices, a hash that is generated by a software building platform for a particular version of a software package;
   receiving, at the one or more computing devices, a signed validation status certificate from a certifier application that certifies the particular version of the software package after providing the particular version and the hash to the certifier application, the signed validation status certificate containing the hash and is signed with a hash signature of the certifier application;
   storing, at the one or more computing devices, the signed validation status certificate as an initial certificate in a validation record chain for the particular version of the software package;
   receiving, at one or more computing devices, an additional signed validation status certificate from an additional certifier application that certifies the particular version of the software package after providing the hash signature along with the particular version to the additional certifier application, the additional signed validation status certificate containing the hash signature and is signed with an additional hash signature of the additional certifier application; and
   appending, at one or more computing devices, the additional signed validation status certificate to the signed validation status certificate in the validation record chain.

13. The computer-implemented method of claim 12, wherein the signed validation status certificate certifies that the particular version of the software package passes an automated software test performed by the certifier application.

14. The computer-implemented method of claim 12, wherein the additional signed validation status certificate is issued by the additional certifier application to certify that the particular version of the software package passes a manual test performed by a human operator.

15. The computer-implemented method of claim 12, wherein the signed validation status certificate is signed with a hash signature that is generated using a unique cryptographic key of a corresponding certifier application.

16. The computer-implemented method of claim 12, further comprising:
   obtaining an additional hash for a copy of the particular version of the software package to be validated; and
   in response to the additional hash matching a corresponding hash included in the initial certificate of the validation record chain for the particular version of the software package, validating the copy based on content of a plurality of certificates in the validation record chain.

17. The computer-implemented method of claim 16, wherein the validating includes determining that the copy is valid when each of a plurality of validation status certificates in the validation record chain indicates that the particular version of the software package meets a corresponding requirement, or determining that the copy is invalid when at least one of the plurality of validation status certificates in the validation record chain indicates that the particular version of the software package fails to meet one or more requirements.

18. The computer-implemented method of claim 16, further comprising determining that the copy is invalid when the hash does not match the corresponding hash included in the initial certificate.

19. A computing device, comprising:
   one or more processors; and
   memory including a plurality of computer-executable components that are executable by the one or more processors to perform a plurality of actions, the plurality of actions comprising:
      receiving a hash that is generated by a software building platform for a particular version of a software package;

receiving a signed validation status certificate from a certifier application that certifies the particular version of the software package after providing the particular version and the hash to the certifier application, the signed validation status certificate containing the hash and is signed with a certifier hash signature of the certifier application;

storing the signed validation status certificate as an initial certificate in a validation record chain for the particular version of the software package;

receiving a signed time certificate certifying that the signed validation status certificate is generated at a specific time and date after providing the signed validation status certificate to a time stamper platform, the signed time certificate being signed by the time stamper platform with a time stamper hash signature; and appending the signed time certificate to the signed validation status certificate in the validation record chain.

20. The computing device of claim 19, wherein the actions further comprise:

receiving an additional signed validation status certificate from an additional certifier application that certifies the particular version of the software package after providing the time stamper hash signature along with the particular version to the additional certifier application, the additional signed validation status certificate containing the time stamper hash signature and is signed with an additional certifier hash signature of the additional certifier application; and appending the additional signed validation status certificate to the signed time certificate in the validation record chain.

* * * * *